United States Patent [19]

Kimball et al.

[11] Patent Number: 5,251,666
[45] Date of Patent: Oct. 12, 1993

[54] BRAKE HOSE COUPLING

[75] Inventors: Francis Kimball, Edison, N.J.; Michael W. Davis, Terre Haute, Ind.

[73] Assignee: Strato Supply Co., Inc., Piscataway, N.J.

[21] Appl. No.: 666,368

[22] Filed: Mar. 8, 1991

[51] Int. Cl.⁵ .................... F16K 37/00; F16L 39/00
[52] U.S. Cl. .................... 137/557; 285/67; 285/69; 285/317; 285/325; 251/148
[58] Field of Search .............. 251/148; 285/68, 69, 285/67, 317, 325; 137/557

[56] References Cited

U.S. PATENT DOCUMENTS

| | | | |
|---|---|---|---|
| 592,899 | 11/1897 | Wilson | 285/317 |
| 608,000 | 7/1898 | Leatherman et al. | 285/317 |
| 918,858 | 4/1909 | James et al. | 285/67 |
| 1,035,565 | 8/1912 | Forth | 285/69 |
| 2,047,581 | 7/1936 | Grissett | 137/557 |
| 4,125,279 | 11/1978 | Scott | 285/69 |
| 4,129,323 | 12/1978 | Wilson | 285/69 |

FOREIGN PATENT DOCUMENTS

| | | | |
|---|---|---|---|
| 579335 | 7/1959 | Canada | 285/69 |
| 1278482 | 10/1961 | France | 285/68 |

Primary Examiner—A. Michael Chambers
Attorney, Agent, or Firm—Omri M. Behr; Matthew J. McDonald

[57] ABSTRACT

A brake hose coupling for coupling to a glad hand body. The glad hand body has a primary port and a pair of primary flanges bordering and angularly spaced about the primary port. The brake hose coupling has a coupling body with a complementary port and a pair of complementary flanges adapted to rotate coaxially into engagement with the primary flanges of the glad hand body The complementary flanges border and are angularly spaced about the complementary port. The brake hose coupling also has a lock with a latching member mounted to reciprocate on the coupling body adjacent and transversely to one of the complementary flanges, between a release and an engage position. In the release position the latching member has clearance to allow passage of a corresponding one of the primary flanges. In the engage position the latching member blocks passage of the corresponding one of the primary flanges. Thus the latching member is operable to lock the coupling body on the glad hand body.

13 Claims, 3 Drawing Sheets

BRAKE HOSE COUPLING

BACKGROUND OF THE INVENTION

The present invention relates to brake hose couplings and, in particular, to coupling bodies that can connect to a glad hand body.

Pneumatic pressure in a brake line will release the brakes of a railroad car allowing a train to move. The brake line is a pipe running along the length of each car with a flexible hose at either end terminating in a glad hand body. Typically the midsection of the brake line connects through angle cocks at either end to the flexible hose and glad hand body. The angle cock at the end of the last car can be closed to keep pressure in the brake line.

A known pneumatic coupling device (U.S. Pat. No. 4,763,875) can attach to the last glad hand coupling for the purpose of terminating the brake line and for measuring the pressure at that terminus. This known coupling body has a handle with a pair of flanges for engaging the flanges of the glad hand coupling. The device has a latching arm that prevents removal by swinging into a position behind one of the glad hand flanges. A disadvantage with this known coupling is the reliance on the existence of clearance behind the glad hand flange. Such clearance may not exist in all models. See also U.S. Pat. Nos. 4,642,892 for a similar device, but lacking a lock.

The angle cocks used in brake lines often employ a lock to prevent inadvertent rotation of the cock. These devices employ latching members that are either operated manually or otherwise. In some embodiments, the latching is performed by lifting the handle of the cock to release the cock. See U.S. Pat. Nos. 236,388; 895,756; 1,707,273; 1,459,654; 1,801,816; 2,048,353; 4,423,749; and 4,456,219.

Some glad hand couplings employ a latch to keep the glad hands together and avoid accidental decoupling from road vibration. Various devices have been employed that involve pivotally mounted latches and wire locking devices. All of them have had disadvantages in that they move awkwardly or are difficult to manipulate. For example, to decouple the glad hand couplings of U.S. Pat. No. 3,879,066, a worker would typically depress lever 28 and then rotate it under a glad hand flange. This operation runs the risk of catching the worker's fingers. See also U.S. Pat. Nos. 236,388; 873,892; 1,525,794; 3,023,031; 3,052,489; 4,129,323; 4,402,534; 4,747,623.

SUMMARY OF THE INVENTION

In the accordance with the illustrative embodiments demonstrating features and advantages of the present invention, there is provided a brake hose coupling for coupling to a glad hand body. The glad hand body has a primary port and a pair of primary flanges bordering and angularly spaced about the primary port. The brake hose coupling has a coupling body with a complementary port and a pair of complementary flanges adapted to rotate coaxially into engagement with the primary flanges of the glad hand body. The complementary flanges border and are angularly spaced about the complementary port. The brake hose coupling also has a lock with a latching member mounted to reciprocate on the coupling body adjacent and transversely to one of the complementary flanges, between a release and an engage position. In the release position the latching member has clearance to allow passage of a corresponding one of the primary flanges In the engage position the latching member blocks passage of the corresponding one of the primary flanges. Thus the latching member is operable to lock the coupling body on the glad hand body.

By employing a brake hose coupling of the foregoing type, an improved device is provided for connecting to a glad hand body. In a preferred embodiment, a handle has a complementary flange supported by a J-shaped stalk, which is straddled by a pivotally mounted fork (or for other embodiments, a plate-like shutter is mounted to reciprocate alongside the flange). The two tines of the fork preferably straddle the stalk below the complementary flange. One of the tines is longer and is arranged to retract toward the coupling body when it is attaching to the glad hand body. When retracted, the tine does not interfere with the glad hand flange rotating past its complementary flange When the glad hand flange passes the longer tine, it springs to a position adjacent to the glad hand flange to prevent reverse rotation.

This preferred brake hose coupling has a central body with a manual exhaust valve to bleed a brake line that has residual pressure. Also the body has a fitting to carry a pressure gauge or transducer to transmit a signal indicating line pressure.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention, when taken in conjunction with the accompanying drawings wherein.

DETAILED DESCRIPTION OF THE PREFERRED EMBODIMENTS

Figure 1:
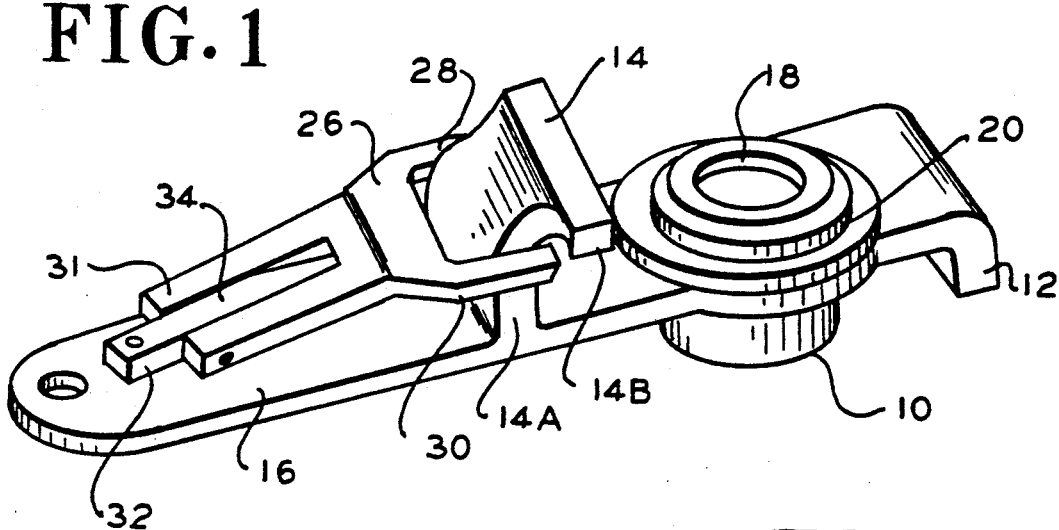
FIG. 1 is a perspective view of a brake hose coupling according to principles of the present invention.
Figure 2:
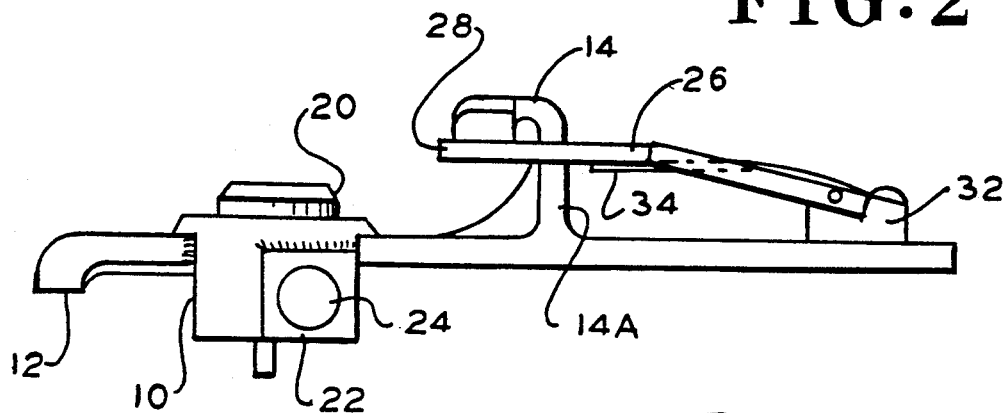
FIG. 2 is an edge view of the coupling of FIG. 1.
Figure 3:
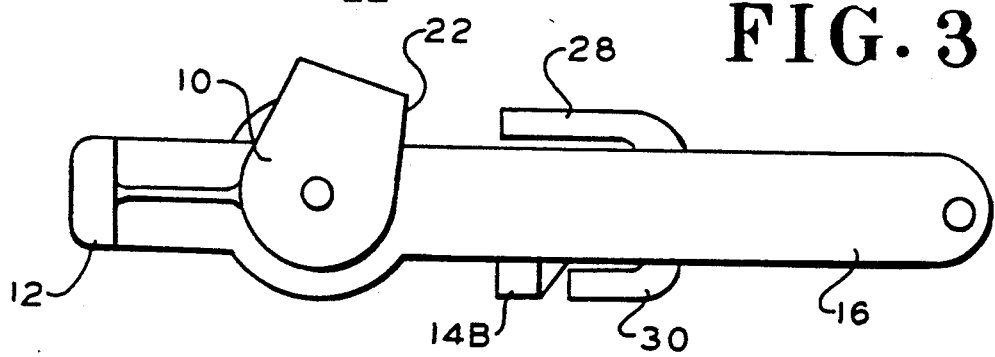
FIG. 3 is a side view of the coupling of FIG. 1.
Figure 4:
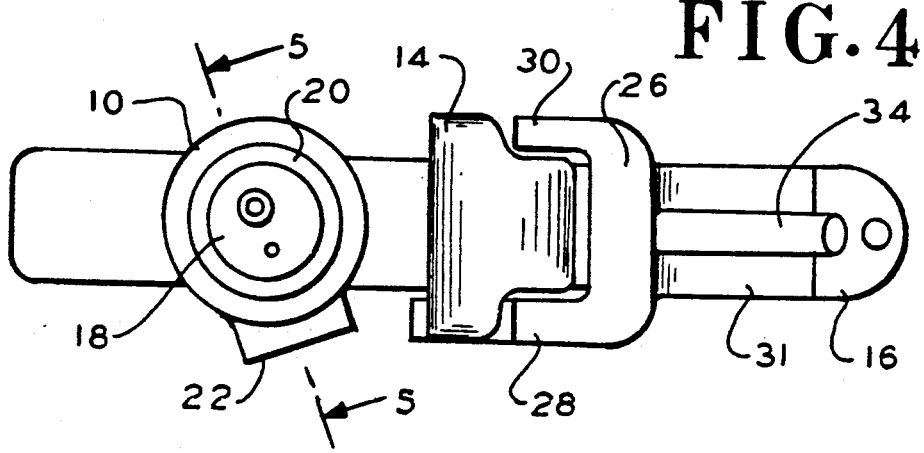
FIG. 4 is a side view which is the reverse of that of FIG. 3.

Referring to FIGS. 1-4, a brake hose coupling is shown as a coupling body 10 having a small complementary flange 12 and a large complementary flange 14. Flanges 12 and 14 extend perpendicularly from opposite sides of handle 16. The center of body 10 is a generally cylindrical casting integral with handle 16. a casting integrally molded with body 10. Flange 14 is a J-shaped bar having a stalk 14A and bearing surface 14B.

Body 10 has a complementary port 18 surrounded by an annular ridge 20 with a bevelled outer corner. Body 10 extends outwardly to a fitting 22 having an internally threaded bore 24 into a planar face.

Lock 26 is shown herein as a forked plate having tines 28 and 30. Longer tine 28 is a latching member. Lock 26 has bifurcated tail 30 straddling and pivotally connected to boss 32. Boss 32 has an slanted face unto which is riveted a bias means in the form of a leaf spring 34 arranged to drive lock 26 away from body 10 and handle 16. The upward rotation of lock 26 is limited when tine 28 abuts the underside of flange 14.

Figure 6:
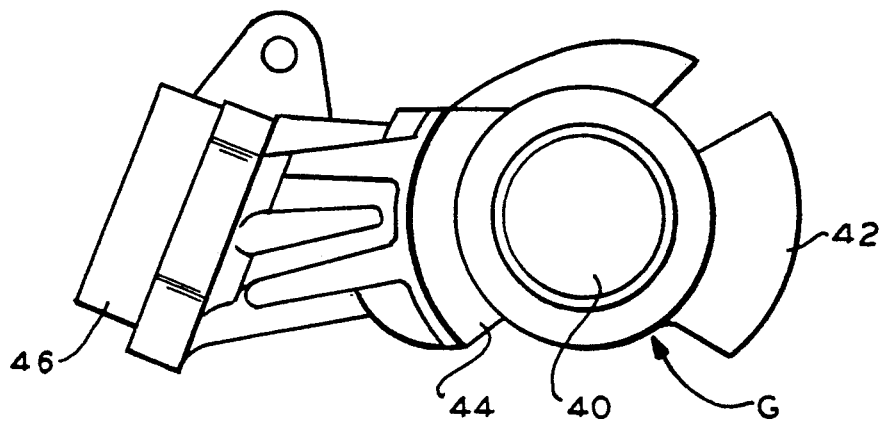
FIG. 6 is a side view of a glad hand body.

Referring to FIG. 6, a glad hand coupling G of the prior art is shown with a primary port 40 and primary flanges 42 and 44. The glad hand coupling of FIG. 6 is a hollow body open at port 40 to communicate with fitting 46

Figure 7:
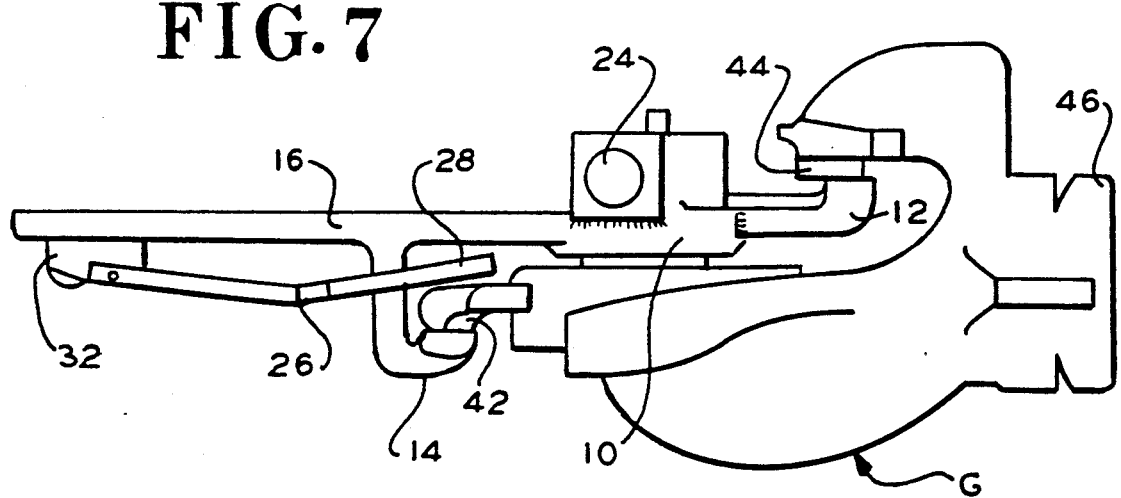
FIG. 7 is an edge view of the coupling of FIG. 1 being attached to the glad hand body of FIG. 6.

Referring to FIG. 7, the coupling of FIG. 1 is shown attached to glad hand body G of FIG. 6. Specifically, the primary flanges 42 and 44 are shown engaging complementary flanges 14 and 12, respectively. The illustration of FIG. 7 shows body 10 partially rotated into position on glad hand body G. When this occurs, lock 26 is lifted toward body 10 and handle 16 to provide outside clearance for the passage of flange 42 over flange 14.

Figure 8:
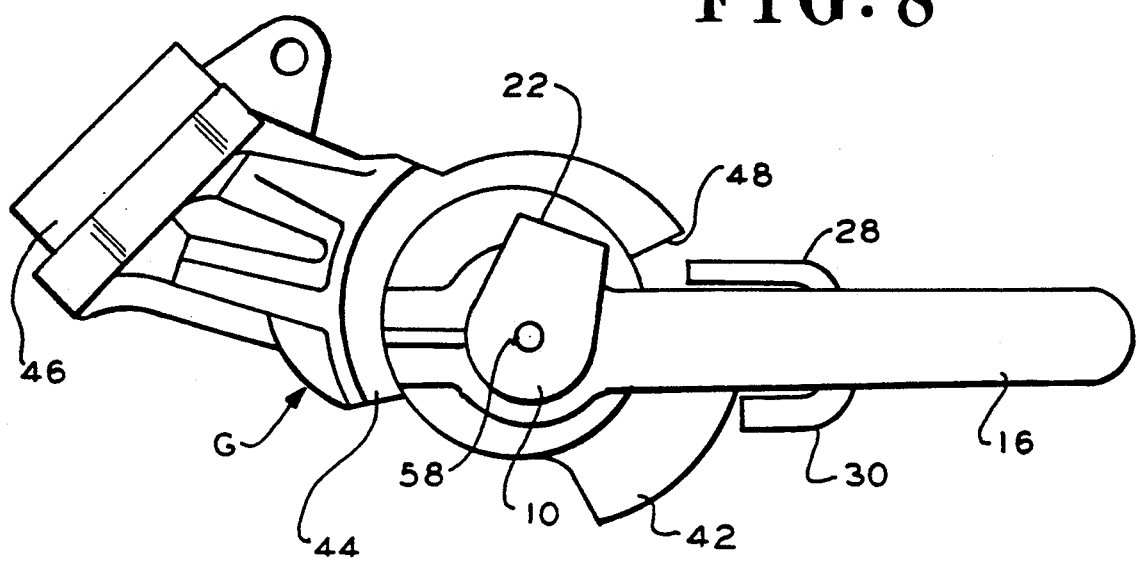
FIG. 8 is a side view of the coupling of FIG. 1 attached and locked into position on the glad hand body of FIG. 6.

Referring to FIG. 8, body 10 is shown rotated into full engagement with the glad hand body G. Thus positioned, tine 28 has passed behind flange 42 and dropped into the illustrated position along side it. Further rotation (counter-clockwise in this view) of handle 16 is not possible since tine 28 eventually flange 14 (not visible this view) or tine 28 will stop against abutment 48. Also, body 10 cannot rotate clockwise since tine 28 will now abut flange 42. Thus body 10 is locked into the approximate angular position illustrated herein.

Figure 5:
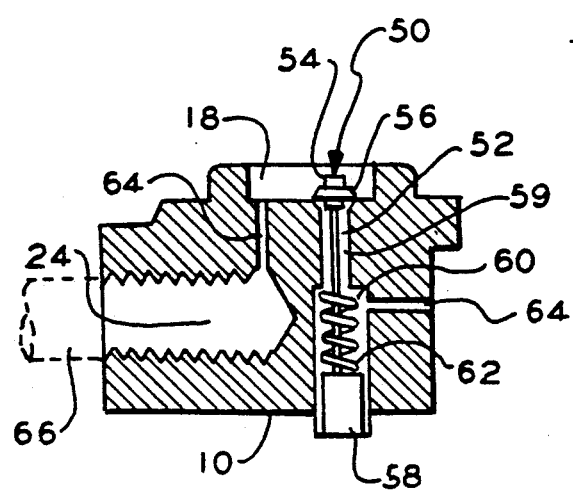
FIG. 5 is a cross-sectional view along lines 5—5 of FIG. 4.

Referring to FIG. 5, body 10 is shown with an exhaust valve 50 comprising stem 52 with a head 54 grooved to hold annular seal 56. Stem 52 has on the end distal to seal 56 a pushbutton 58 which extents outside body 10. Push button 58 rides in enlarged chamber 60 over entrapped compression spring 62 which holds valve 50 closed. When push button 58 is depressed, port 18 is vented through side vent 64. Threaded bore 24 is shown communicating with an orifice 64 to port 18. A pressure gauge 66 can be threaded into bore 24 to monitor the pressure at port 18.

In operation, body 10 may be rotated into position using handle 16 with tine 28 retracted as shown in FIG. 7, until the position of FIG. 8 is achieved. When the lock position is achieved, tine 28 is driven by spring 34 into the engage position as shown in FIG. 8. Thereafter, body 10 cannot be removed without again retracting tine 28.

If a pressure gauge 66 (FIG. 5) or other monitor is threaded into fitting 22, body 10 effectively seals glad hand body G. Thus if glad hand body G is the last one on a train, the brake line can be pressurized without leaking through glad hand body G. Also, a pressure gauge 66 in fitting 22 can monitor the line pressure and a transducer can be used to transmit pressure information forward.

In the event that the train is parked and the pneumatic pump ordinarily pressurizing the brake line is stopped, (or if an unillustrated angle cock has been closed to isolate glad hand G), body 10 can be removed by depressing push button 58 to bleed residual pressure inside glad hand body G. Thereafter, tine 28 can be retracted and body 10 rotated to disengage glad hand body G.

Figure 9:
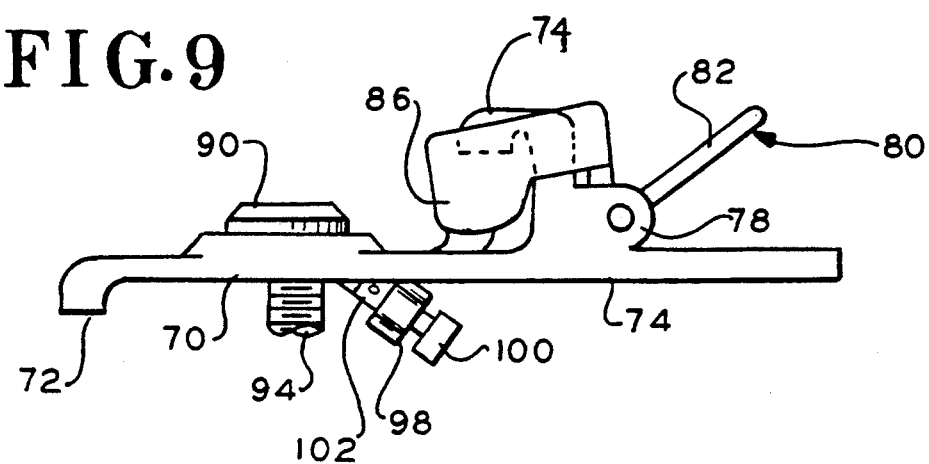
FIG. 9 is an edge view of a brake hose coupling that is an alternate to that of FIG. 1.
Figure 10:
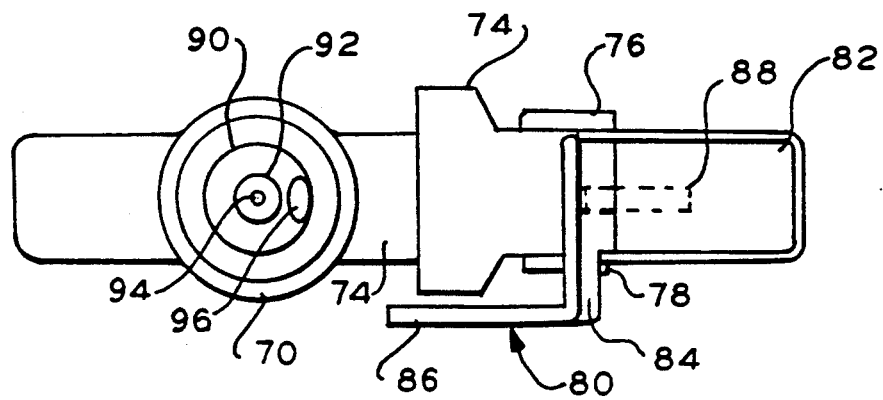
FIG. 10 is a side view of the coupling of FIG. 9.

Referring to FIG. 9 and 10, a generally cylindrical body 70 has extending from it a smaller flange 72 and a handle 75. Mounted upright on handle 75 is larger, J-shaped flange 74. As before, flanges 72 and 74 are designed to mate with primary flanges on a glad hand body such as that shown in FIG. 6.

Integral with the sides of flange 74 are a parallel pair of journals 76 and 78 in which a lock 80 is rotatably mounted. Lock 80 has a lever plate 82 integral with a support plate 84. Plates 82 and 84 are about 45 degrees apart. Perpendicularly mounted to the side of support plate 84 is a latching member 86 in the form of a "P" shaped plate. Latching member 86 serves a function similar to the previously illustrated latching member (tine 28 of FIG. 8.) As before, the latching member 86 is position alongside one of the flanges of the glad hand body to prevent removal by preventing rotation of the body 70.

Lock 80 has a bias means 88 in the form of a leaf spring that is secured to the inside face of plate 84 by a screw (not shown). The leaf spring 88 passes underneath the lever 82 and bears against the surface of handle 74. Accordingly, bias means 88 urges lock 80 into the position illustrated.

As before, port 90 is shown with an annular ridge defining a generally cylindrical region that communicates through threaded bore 92 to a threaded coupling 94. Coupling 94 can be part of a pressure gauge or a line feeding a transducer for sending pressure signals to a remote operator. Relief valve 98 is threaded into slanted bore 96 in port 90. Valve 98 works similarly to the previously illustrated exhaust valve in that depressing push button 100 vents port 90 through side vent 102. Valving structure employed to allow such venting may be similar to the valving used in the embodiment illustrated previously.

It is to be appreciated that various modifications may be implemented with respect to the above described preferred embodiments. The lock can be shaped in various ways and can be attached to the coupling body with hinges, pivot pins and similar devices. Furthermore, the lock need not be forked or bifurcated. Furthermore, in some embodiments the exhaust valve can be eliminated or modified in various ways using alternate components. Also in embodiments where the line pressure need not be monitored, the pressure gauge fitting can be eliminated. Furthermore, various springs incubing compression and leaf springs of various configurations can be used instead of those illustrated.

Obviously, many modifications and variations of the present invention are possible in light of the above teachings. It is, therefore, to be understood that within the scope of the appended claims, the invention may be practiced otherwise than as specifically described.

We claim:

1. A brake hose coupling for coupling to a glad hand body having a primary port and a pair of primary flanges bordering and angularly spaced about said primary port, said coupling comprising:
   a coupling body having a complementary port and a pair of complementary flanges, one of said flanges being larger than the other, said coupling body being adapted to rotate coaxially into engagement with said primary flanges of said glad hand body, said complementary flanges bordering and being angularly spaced about said complementary port, the larger one of said complementary flanges having a stalk terminating with a bearing surface; and a lock comprising:
- a) a latching member including a fork a pair of tines straddling said stalk, a first one of said tines extending alongside said stalk, said fork having an end distal from the tines and pivotally connected to said coupling body, said fork of said latching member mounted to reciprocate on said coupling body adjacent and transversely to one of said complementary flanges between a release and an engage position, and
- b) a leaf spring bias means coupled between said coupling body and said fork to urge said fork into said engage position, in said release position said second one of said tines having clearance to allow passage of a corresponding one of said primary flanges, in said engage position said second one of said tines blocking passage of said corresponding one of said primary flanges, so that said latching member is operable to lock said coupling body on said glad hand body.

2. A brake hose coupling according to claim 1 wherein said coupling body has an an external fitting communicating with said complementary port and emerging from said coupling body radially closer to said complementary port than said complementary flanges.

3. A brake hose coupling according to claim 2 further comprising:

an exhaust valve reciprocatably mounted in said coupling body to vent said complementary port to atmosphere.

4. A brake hose coupling according to claim 1 further comprising:

an exhaust valve reciprocatably mounted in said coupling body to vent said complementary port to atmosphere.

5. A brake hose coupling according to claim 4 wherein said coupling body has a fitting communicating with said complementary port and adapted to engage a measuring instrument.

6. A hose coupling according to claim 4 further comprising a pushbutton slidably mounted in said coupling body to operate said exhaust valve.

7. A brake hose coupling according to claim 6 wherein said pushbutton is opposite said complementary port and is mounted to slide at an acute angle to the axis of said complementary port.

8. A brake hose coupling according to claim 7 wherein in said release position said latching member is closer to said coupling body than in said engage position, in said release position said latching member having on its outside clearance to allow passage of a corresponding one of said primary flanges.

9. A brake hose coupling according to claim 1 wherein said latching member comprises a pivotally mounted plate.

10. A brake hose coupling according to claim 9 wherein said pivotally mounted plate includes a crooked rocker having a crook pivotally attached to said body, said plate having a radial and a transverse wall that are contiguous and located to the inside of said crook.

11. A brake hose coupling according to claim 1 wherein said coupling body has an external fitting communicating with said complementary port and emerging from said coupling body at an angle between said complementary flanges.

12. A brake hose coupling according to claim 1 wherein said coupling body has an external fitting communicating with said complementary port and emerging on a side of said coupling body opposite said complementary port.

13. The brake hose coupling of claim 1 wherein a second one of said tines extends beyond said stalk.

* * * * *